United States Patent
Mufti

(10) Patent No.: US 9,226,095 B2
(45) Date of Patent: Dec. 29, 2015

(54) METHOD FOR ENHANCING MACHINE TYPE COMMUNICATION BETWEEN A MOBILE COMMUNICATION NETWORK AND A MACHINE TYPE COMMUNICATION DEVICE

(71) Applicant: Deutsche Telekom (UK) Limited, Hertfordshire (GB)

(72) Inventor: Moyeen Mufti, Hayes (GB)

(73) Assignee: DEUTSCHE TELEKOM (UK) LIMITED, Hertfordshire (GB)

( * ) Notice: Subject to any disclaimer, the term of this patent is extended or adjusted under 35 U.S.C. 154(b) by 35 days.

(21) Appl. No.: 14/079,761

(22) Filed: Nov. 14, 2013

(65) Prior Publication Data
US 2014/0134984 A1 May 15, 2014

(30) Foreign Application Priority Data
Nov. 15, 2012 (EP) .................................... 12192846

(51) Int. Cl.
*H04M 3/42* (2006.01)
*H04W 4/00* (2009.01)
*H04W 74/08* (2009.01)

(52) U.S. Cl.
CPC .......... *H04W 4/005* (2013.01); *H04W 74/0833* (2013.01)

(58) Field of Classification Search
CPC . H04W 74/0833; H04W 74/08; H04B 7/2637
USPC ......................................................... 455/414
See application file for complete search history.

(56) References Cited

U.S. PATENT DOCUMENTS

| | | | |
|---|---|---|---|
| 2006/0159307 A1* | 7/2006 | Anderson et al. | B07C 7/005 382/101 |
| 2008/0130580 A1* | 6/2008 | Chaponniere et al. | H04W 36/02 370/331 |
| 2008/0279257 A1* | 11/2008 | Vujcic et al. | ................. 375/132 |
| 2011/0244907 A1 | 10/2011 | Golaup et al. | |
| 2011/0274040 A1 | 11/2011 | Pani et al. | |
| 2012/0082106 A1 | 4/2012 | Wang et al. | |

FOREIGN PATENT DOCUMENTS

WO    WO 2012135996 A1    10/2012

* cited by examiner

*Primary Examiner* — Thomas Lett
(74) *Attorney, Agent, or Firm* — Leydig, Voit & Mayer, Ltd.

(57) ABSTRACT

A method for machine-type communication between a mobile communication network and a machine-type communication device includes: determining, by the machine-type communication device, a waiting time interval based on identity information and time interval information stored in the machine-type communication type and based on application of a hash function operation applied to the identity information; and requesting, by the machine-type communication device, access to a random access resource of the mobile communication network after the determined waiting time interval has elapsed.

17 Claims, 1 Drawing Sheet

METHOD FOR ENHANCING MACHINE TYPE COMMUNICATION BETWEEN A MOBILE COMMUNICATION NETWORK AND A MACHINE TYPE COMMUNICATION DEVICE

CROSS-REFERENCE TO RELATED APPLICATIONS

This application claims priority to European Patent Application No. EP 12192846.9, filed on Nov. 15, 2012, which is hereby incorporated by reference herein in its entirety.

FIELD

The present invention relates a method for enhancing machine type communication between a mobile communication network, e.g. a public land mobile network, and a machine type communication device.

The present invention further relates to a machine type communication device for enhancing communication with the mobile communication network, and to a mobile communication network for enhancing machine type communication in the mobile communication network.

BACKGROUND

Machine type communication is increasingly used in cellular access networks, as well as in information and telecommunications systems in general. Examples of systems using machine type communication devices for machine type communication operations include:

remotely controlled power meters as well as metering machine type communication devices, remotely controlled machine type communication devices for controlling functions e.g. in a home which make it possible to turn heating on prior to arriving home.

In addition to such examples of stationary machine type communication, there are also applications of mobile machine type communication, such as remotely monitoring and/or controlling functions or status information in a car, boat, or some other kind of vehicle.

Due to the vast amount of possible applications for machine type communication, machine type communication devices and machine type communication systems, a significant increase in signaling traffic and in data traffic in cellular access systems can be expected.

Release 10 of the Third Generation Partnership Project (3GPP Rel-10) refers to applications or scenarios of machine type communication (or machine to machine communication (M2M communication) scenarios) and typically defines a plurality of machine type communication devices which are controlled by a machine type communication server. The machine type communication server is a functional entity that is either part of the mobile communication network or which is located outside of the mobile communication network (belonging or operated by a machine to machine service provider) to which the machine type communication devices are connected or with which the machine type communication devices communicate.

A typical machine type communication device is connected through cellular access networks to mobile communication networks, the access networks including typically GSM (Global System of Mobile Communication) access networks, GPRS (General Packet Radio System) access networks, and/or EPS/LTE (Evolved Packet System/Long Term Evolution) access networks. The application in which a machine type communication device is used needs the machine type communication device to report data, or it may happen that the machine type communication server needs to transmit data to the machine type communication device.

Machine type communication devices tend to access the mobile communication network or transmit data at the same time, i.e. in a synchronized fashion.

User equipments generally and machine type communication devices in particular, used in a cellular mobile communication networks such as GPRS (General Packet Radio System), EDGE (Enhanced Data Rates for GSM Evolution), UMTS (Universal Mobile telecommunications System), HSDPA, HSUPA, or LTE (Long Term Evolution) make use of a random access procedure (e.g. usage of the Random Access Channel (RACH)) to gain access to the mobile communication network. In addition to this, machine type communication devices may use RACH (Random Access Channel) to transmit small amounts of data in UMTS. According to the standard procedure, user equipments in UMTS randomly choose a signature from a group of broadcast signatures and attempt to access the network in some predefined slots. It is quite likely that a large number of machine type communication devices are present in one cell and they are all configured to access the mobile communication network in a synchronized fashion. The probability of RACH access collisions or contentions is quite high and consequently network resources would be overwhelmed.

Furthermore, in a scenario of using connectivity of a UMTS mobile communication network, user equipments that are already in connected mode (i.e. listening to the paging channel of the respective radio cell (Cell-PCH)), an analogous scenario is applied in order to transmit data, namely to access a random access resource of the UMTS cell. In this scenario, in case of a high number of devices wishing to transmit (e.g. 100 devices), the devices are likely to contend for the same random access resources (e.g. Random Access Channel (RACH)), and this contention would not only result in failure for some of the devices in obtaining cell resources but also overwhelm the cell making it difficult for any other device (i.e. machine type communication devices as well as conventional user equipments) for accessing the network resources.

This synchronized access is a known problem with conventional systems. There are existing approaches to deal with random access messages from different user equipments, such as access class barring or the like. However, this mechanism is involves network signaling which requires devices to be in an on-state resulting in additional energy consumption. Such a situation is unwanted for devices which obtain their power from a battery source.

SUMMARY

In an embodiment, the present invention provides a method for machine-type communication between a mobile communication network and a machine-type communication device. The method includes: determining, by the machine-type communication device, a waiting time interval based on identity information and time interval information stored in the machine-type communication type and based on application of a hash function operation applied to the identity information; and requesting, by the machine-type communication device, access to a random access resource of the mobile communication network after the determined waiting time interval has elapsed. The hash function corresponds to a modulo operation on the numerical value of a number derived from the identity information or to a modulo operation on the digit sum of a number derived from the identity information. A predetermined divisor value is used in the modulo operation. And, the divisor value used in the modulo operation corresponds to a number of groups to which machine type communication devices are assigned by applying the hash function operation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
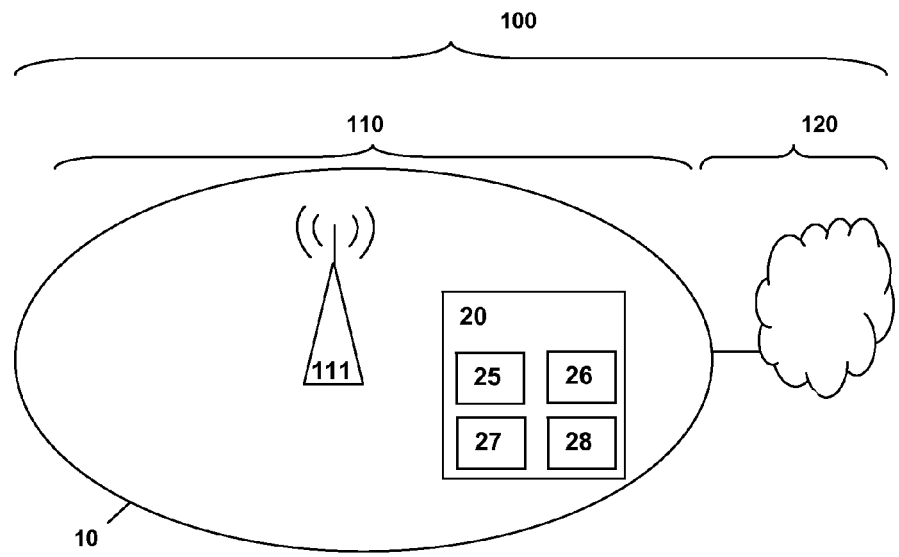
FIG. 1 schematically illustrates a mobile communication network that is enabled for enhanced machine type communication with a machine type communication device.

The present invention provides a technically simple, effective and especially cost effective solution for enabling an enhanced machine type communication between a mobile communication network on the one hand and a machine type communication device on the other hand. The present invention further provides a user equipment or a machine type communication device for enhancing machine type communication with a mobile communication network, as well as a mobile communication network for enhancing machine type communication with a machine type communication device that allow for an efficient communication between the machine type communication and the mobile communication network with enhance communication characteristics and lower probability of network congestion situations.

The present invention provides a method for enhancing machine type communication between a mobile communication network on the one hand and a machine type communication device on the other hand, wherein, in case that the machine type communication device needs to access a shared random access resource (e.g. RACH) of the mobile communication network, the method comprises the following steps in a first step, based on
   an identity information stored in the machine type communication device, and
   a time interval information stored in the machine type communication device,
a waiting time interval is determined by the machine type communication device dependent on the time interval information and dependent on the result of a hash function operation applied to the identity information, and
in a second step, the random access resource of the mobile communication network is requested to be accessed by the machine type communication device after the waiting time interval has elapsed.

It is thereby advantageously possible according to the present invention that the mobile communication network, i.e. network elements or network entities of the mobile communication network, do not need to be modified. The inventive method enables a machine type communication device to self-determine when it can access the random access resources of the mobile communication network, especially the RACH (random access channel), without impacting the accesses of other machine type communication devices also potentially requesting access to the random access resource. Advantageously, additional network signaling is not required.

In the context of the present invention, reference is made to machine type communication devices. Such machine type communication devices are typically used specifically for machine type communication purposes. However, each user equipment to be potentially used in a mobile communication network (such as ordinary mobile phones, smart phones, tablet computers or other mobile devices such as personal digital assistants or the like) can potentially be used for machine type communication purposes, e.g. to transmit certain information, for example relating to a geographic position (in case that the mobile device comprises means to detect the geographic position of the mobile device using a receiver of a GNSS (global navigation satellite system) such as the GPS (global positioning system)) or relating to a temperature value or an acceleration value in case that the mobile device comprises an appropriate sensor device or sensor module. Therefore, the term machine type communication device also encompasses the case that the mobile device is a user equipment to be used in the mobile communication network, e.g. for voice communication and/or data communication purposes and is additionally used as a machine type communication device.

According to the present invention, it is advantageously possible that the machine type communication device self-determines the timeslot (or determines whether it belongs to a group of machine type communication devices that use the same timeslot or the same calculated waiting time interval). Additionally in the case of UMTS devices used as machine type communication devices according to the present invention, already in connected mode (i.e. Cell_PCH mode), the method determines when to access Traffic Channel resources (e.g. dedicated channels) for transmission of data.

For RACH access in UMTS or LTE; or transmission in UMTS, an added step could be the following: Within each group identified by the Group Identifier an appropriate modulo division (e.g. 10 for UMTS, 50 for LTE) determines the selection of preamble code which ensures that multiple machine type communication devices do not end up selecting the same RACH preamble. A similar method can be applied for determining the RACH slot in GPRS. This means that there is a temporal spreading established by using the hash function operation to determine the calculated waiting time interval and there is a spreading among different RACH preambles by using a second hash function, especially a second modulo operation operating on a modified identity information.

According to the present invention, a hash function operation or hash function is performed to determine the calculated waiting time interval. The machine type communication devices concerned by the method according to the present invention are subdivided in a number of different groups, each group of machine type communication devices having a certain timeslot for randomly accessing the random access resource of the mobile communication network. According to the present invention, the number of groups is chosen such that in ordinary situations, the number of machine type communication devices in one network cell (or radio cell of the mobile communication network) that belong to one and the same group is sufficiently low that a parallel access to the random access resource of the mobile communication network in that radio cell can be granted without resulting in congestion situations.

According to the present invention, the access to the random access resource of the mobile communication network (e.g. the random access channel or the dedicated channels (for UMTS devices)) is based on a group identifier, i.e. defining to which group the respective machine type communication device belongs. The group identifier groups multiple devices together which will attempt to access the random access resources (e.g. the random access channel) at the same time.

According to a preferred embodiment of the present invention, the waiting time interval corresponds to the product of, on the one hand, the length of the time interval corresponding to the time interval information, and, on the other hand, the result of the hash function operation applied to the identity information which results in a group number.

Thereby, it is advantageously possible according to the present invention that situations resulting in congestion can effectively be avoided.

According to a further preferred embodiment of the present invention, the hash function corresponds to a modulo operation on the numerical value of the identity information or to a modulo operation on the digit sum of the identity information by a group number, which provides a group identifier Thereby, it is advantageously possible according to the present invention that an easy and simple hash function is used and nevertheless a sufficiently equal distribution of the different machine type communication devices among the different groups is possible.

Furthermore, according to an embodiment of the present invention, it is preferred that a predetermined divisor value is used in the modulo operation.

The divisor value used in the modulo operation corresponds to the number of groups to which the concerned machine type communication devices are assigned by way of applying or conducting the hash function operation.

According to a further preferred embodiment of the present invention, the identity information comprises the IMSI (International Mobile Subscriber Identity) and/or the IMEI (International Mobile Equipment Identity) and/or the MAC address (Media Access Control address).

Thereby, it is advantageously possible to base the assignment of a given machine type communication device on a simple and easily available value or information. According to the present invention, the identity information comprises the IMSI and/or the IMEI and/or the MAC address, i.e. the identity information either comprises the IMSI of the machine type communication device, or alternatively, the identity information comprises the IMEI of the machine type communication device, or alternatively the identity information comprises the MAC address, or alternatively, the identity information comprises the IMSI and the IMEI or the IMSI and the MAC address or the IMEI and the MAC address of the machine type communication device. Still alternatively, the identity information on which the hash function operation is conducted may be a part of the IMSI or a part of the IMEI or a part of MAC address, or both a part of the IMSI and a part of the IMEI and part of MAC address.

According to the present invention, it is furthermore preferred that, based on a predetermined point in time (called base time), the random access resource of the mobile communication network is requested to be accessed by the machine type communication device after the calculated waiting time interval has elapsed after the predetermined point in time.

Thereby, it is advantageously possible according to the present invention that the machine type communication devices access the random access resource of the mobile communication network at a given predetermined time, corresponding to the predetermined point in time.

According to the present invention, it is preferred that the predetermined point in time is defined for a specific predetermined period of time such that it is advantageously possible according to the present invention that the machine type communication devices, e.g., access the random access resource of the mobile communication network once (e.g. at 11 am) every day (in case that the predetermined point in time is defined for a period of time of 24 hours), or once a week (in case that the predetermined point in time is defined for a period of time of seven days).

According to the present invention, the predetermined point in time (defined for a period of time) corresponds very much to a defined base time to which all the machine type communication devices of a specific type (or device category) are synchronized such that starting from that base time all the different groups of machine type communication devices belonging to that same specific type (or device category) (and hence having the same base time) will access the random access resource of the mobile communication network according to the present invention, i.e. not all those machine type communication devices will request that access precisely at the base time but only one group of those machine type communication devices (i.e. the group having as a result of the hash function operation the value zero) will access the random access resource at the base time and all the other groups of those machine type communication devices will access the random access resource at points in time spaced by the time interval information, e.g. 100 seconds, or 200 seconds or the like.

According to the present invention, it is furthermore preferred that, in case that a preceding request to access the random access resource of the mobile communication network has been unsuccessful, a retransmission of a request to access the random access resource of the mobile communication network is performed by the machine type communication device, wherein a further calculated waiting time interval is determined by the machine type communication device, the further calculated waiting time interval being dependent on the time interval information (or alternatively dependent on a further time interval information, being different from the time interval information used for the preceding request to access the random access resource) and dependent on the result of the hash function operation applied to a modified identity information.

According to the present invention, it is thereby advantageously possible that calculation of the retransmission time can be performed independently from the time of the preceding request to access the random access resource of the mobile communication network. For example, it is possible and preferred according to the present invention that for calculating the calculated waiting time interval, the numerical value (or the digit sum) of the IMSI of the machine type communication device is used (i.e. a modulo operation performed on the numerical value (or the digit sum) of the IMSI of the machine type communication device) resulting in a remainder (of the modulo operation leading to the calculated waiting time interval), and that for calculating the further calculated waiting time interval, the numerical value (or the digit sum) of the IMSI but without the last digit (or alternatively of the IMEI but without the last digit, or alternatively of the MAC address, or alternatively of a combination of the IMSI and/or the IMEI and/or of the MAC address, but without the last digit) of the machine type communication device is used (i.e. a modulo operation performed on the numerical value (or the digit sum) of the modified IMSI/IMEI/MAC address of the machine type communication device) resulting (generally in a different remainder (of the modulo operation leading to the further calculated waiting time interval).

According to the present invention, it is possible and preferred that the time of the retransmission (i.e. the access request by which the machine type communication device is configured to try to access the random access resource again, i.e. after an unsuccessful preceding access request) is defined such that after the preceding access request is established to be unsuccessful (e.g. by way of the reception (by the machine type communication device) of an error message indicating that the random access resource is not available or indicating that the random access resource is currently congested, or by way of a timer (started when the preceding access request is sent) running out), the further calculated waiting time interval is determined (based on the time interval information (or alternatively a further time interval information in case that for the retransmission a different time interval information is used) and dependent on the result of the hash function operation applied to a modified identity information) by the machine type communication device, and, after the further calculated waiting time interval has elapsed, the retransmission is initiated (i.e. the random access resource of the mobile communication network being accessed again).

Furthermore according to the present invention, it is possible and preferred that the time of the retransmission is defined such that the further calculated waiting time interval is determined by the machine type communication device, and, after the further calculated waiting time interval has elapsed after the point in time of the preceding access request, and additionally a time gap, the retransmission is initiated (i.e. the random access resource of the mobile communication network being accessed again). According to the present invention, the time gap corresponds to an additional time slot (e.g. of equal duration as the time interval information or the further time interval information) which takes into account that the machine type communication device cannot retransmit in the transmission time slot if the retransmission group identifier (i.e. the remainder of the modulo operation of the retransmission) computes to zero.

According to the present invention, it is thereby advantageously possible to realize a deterministic retransmission time ensuring a minimum probability of collision or contention based on applying the hash function on a modified identity information, such as a modulo division on the IMSI but without the last digit.

Furthermore, the present invention relates to a machine type communication device for enhancing machine type communication with a mobile communication network, wherein, in case that there is a need for the machine type communication device to access a random access resource of the mobile communication network, the machine type communication device is configured such that
based on
   an identity information stored in the machine type communication device, and
   a time interval information stored in the machine type communication device,
   an optional time base,
a calculated waiting time interval is determined by the machine type communication device dependent on the time interval information and dependent on the result of a hash function operation applied to the identity information—or to a modified identity information, e.g. by a reduction of a digit in the identifier information—, and
the random access resource of the mobile communication network is requested to be accessed by the machine type communication device after the calculated waiting time interval has elapsed.

Thereby, it is advantageously possible to use the machine type communication device in a classically operational mobile communication network without the need to modify any network components of the mobile communication network specifically for using the machine type communication functionality.

It is furthermore preferred according to the present invention—also with respect to the machine type communication device—that the calculated waiting time interval corresponds to the product of the length of the time interval corresponding to the time interval information, and the result of the hash function operation applied to the identity information.

It is furthermore preferred according to the present invention—also with respect to the machine type communication device—that the hash function corresponds to
a modulo operation on the numerical value of a number derived from the identity information, or
a modulo operation on the digit sum of a number derived from the identity information.

It is furthermore preferred according to the present invention—also with respect to the machine type communication device—that a predetermined divisor value (provided by network, corresponding to number of groups) is used in the modulo operation.

It is furthermore preferred according to the present invention—also with respect to the machine type communication device—that the identity information comprises the IMSI (International Mobile Subscriber Identity) and/or the IMEI (International Mobile Equipment Identity).

Additionally, the present invention relates to a mobile communication network for enhancing machine type communication with a machine type communication device according to the present invention, wherein the mobile communication network transmits the time interval information and information related to the hash function operation (number of groups) and optionally base time.

Additionally, the present invention relates to a program comprising a computer readable program code which, when executed on a computer or on machine type communication device or on a network component of a mobile communication network, causes the computer or the machine type communication device or the network component of the mobile communication network to perform the inventive method.

Still additionally, the present invention relates to a computer program product for using a machine type communication device with a mobile communication network, the computer program product comprising a computer program stored on a storage medium, the computer program comprising program code which, when executed on a computer or on machine type communication device or on a network component of a mobile communication network, causes the computer or the machine type communication device or the network component of the mobile communication network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells, one of which is represented in FIG. 1 by a solid line and reference sign 10. In the mobile communication network 100, typically a plurality of user equipments and/or machine type communication devices are camping on the telecommunications network 100 within the network cell 10, i.e. the user equipments and/or machine type communication devices are connected or are camping on a base station 111 serving the cell 10. The base station 111 is typically a base station, e.g. BTS (base transceiver station), NodeB or an eNodeB base station.

A machine type communication device is schematically represented by reference sign 20. The machine type communication device 20 comprises identity information 25, typically the IMSI, the IMEI, MAC address, a combination of the IMSI and the IMEI or a part of the IMSI, a part of the IMEI or a part of the combination of the IMSI and the IMEI. Typically, the identity information 25 is at least partially stored in a SIM (subscriber identity module) (not represented in FIG. 1) of the machine type communication device 20. The machine type communication device 20 furthermore comprises time interval information 26. The time interval information 26 corresponds to the spacing (in time) of the access requests (requesting the random access resource of the mobile communication network 100 that different groups of the machine type communication devices 20 perform. Additionally, the machine type communication device 20 typically comprises a divisor value 27 (i.e. a number of groups) and a predetermined point in time 28 (base time).

The machine type communication 20 furthermore typically comprises a processing module comprising a processor configured to perform the hash function operation.

Figure 2:
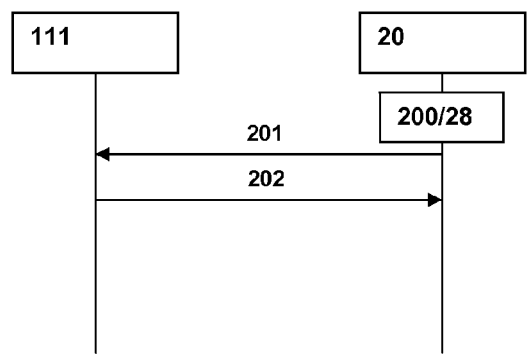
FIG. 2 schematically illustrates the general communication diagram between a base station of a mobile communication network and a machine type communication device according to the present invention.

In FIG. 2, a communication diagram between the base station 111 (i.e. the mobile communication network 100) and the machine type communication device 20 according to the present invention are schematically shown.

According to the present invention, in case that there is a need for the machine type communication device 20 to access the random access resource of the mobile communication network 100 (i.e. a need to access the base station 111 of radio cell 10), the machine type communication device 20 sends an access request, via a first message 201, to the base station 111 (i.e. to the mobile communication network 100) and receives an answer, via a second message 202, from the base station 111 (i.e. from the mobile communication network 100) to the machine type communication device 20. The need to access the base station 111 is represented by reference sign 200. Alternatively, the predetermined point in time 28 occurs.

Figure 3:
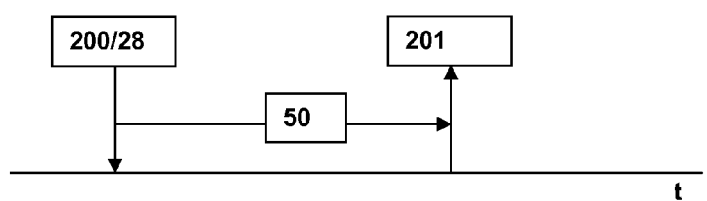
FIG. 3 schematically illustrates a timeline with respect to the communication between the base station and a machine type communication device.

In FIG. 3, the communication between the machine type communication device 20 and the mobile communication network 100 (or the base station 111 of the mobile communication network 100) is schematically represented by a timeline represented as a horizontal line in FIG. 3.

At a first point in time, represented by reference signs 200/28, either the need for the machine type communication device 20 to access the random access resource of the mobile communication network 100 occurs or the predetermined point in time 28 occurs. By way of the hash function, a calculated waiting time 50 is calculated by the machine type communication device 20 (typically by the processing module within the machine type communication device 20) based on the time interval information 26 based on the identity information 25 stored in the machine type communication device 20, and based on the defined number of groups, the defined number of groups corresponding to the divisor value 27 in case of using a modulo operation as the hash function. The calculated waiting 50 defines the point in time when the access request 201 to access the random access resource of the base station 111 (or of the mobile communication network 100) is performed.

According to the present invention, the concerned machine type communication devices 20 are divided in groups (or assigned to groups) such that a group of machine type communication devices 20 corresponds to all machine type communication devices 20 that have the same calculated waiting time interval 50, i.e. which have the same remainder of the modulo operation corresponding to the hash function to be performed. The number of groups of machine type communication devices 20 as well as the time interval information 26 is dependent on the specific needs of the machine type communication application of the machine type communication devices 20 and also on the network optimization and QoS (Quality of Service) Assignment.

In case that one or more machine type communication devices 20 cannot access the random access resource of the mobile communication network 100 (or of the base station 111), instead of applying a random backup time for retransmission, the machine type communication device 20 computes its next transmission slot (to transmit the request to access the random access resource) based on a modulo division of a modified identity information (such as the IMSI or the IMEI or the MAC address minus the last digit) by an appropriate group size, i.e. a dividend of the modulo operation corresponding to the modulo operation performed for computing the further calculated waiting time interval. The usage of the same group size as originally (i.e. for the preceding request to access the random access resource of the mobile communication network 100) used for computing the transmission group provides an even temporal spreading of retransmission of the unsuccessful machine type communication devices 20, especially in case that all machine type communication devices 20 in a particular transmission slot (i.e. belonging to the same group of machine type communication devices 20) were unsuccessful.

Remote device management procedures are to be used, according to the present invention, to transmit and provision required parameters (i.e. time interval information 26, the divisor value 27 as well as the predetermined point in time 28,) in the machine type communication device 20. In case that the operator determines that the access requests of the machine type communication devices to the random access resource are colliding (e.g. as the access times are not spread sufficiently in time), the operator can vary the number of groups (i.e. the divisor value 27) via remote device management.

Illustrative Example

Assuming for a number of machine type communication devices 20, attached to the same base station 111 of the mobile communication network 100, the predetermined point in time (reference sign 28), respectively stored in the machine type communication devices 20, is 11 pm (on a certain day or on every day), and furthermore assuming that the divisor value 27, i.e. the number of groups into which the number of machine type communication devices 20 should be divided by a modulo operation hash function operating on the digit sum of the IMSI number, amounts to 10:
if the time interval information 25 amounts to 2 minutes (120 seconds),
a first machine type communication device (device #1) has IMSI number 310150123456787, and
a second machine type communication device (device #2) has IMSI number 310150123456056,
then the first machine type communication device (device #1) tries to access the random access resource of the mobile communication network 100 at 11:06 pm (as the digit sum 3+1+0+1+5+0+1+2+3+4+5+6+7+8+7 equals to 53, the result of the modulo operation being 3, resulting in an access time of 11 pm+3 times 2 minutes), and the second machine type communication device (device #2) tries to access the random access resource of the mobile communication network 100 at 11:04 pm (as the digit sum 3+1+0+1+5+0+1+2+3+4+5+6+0+5+6 equals to 42, the result of the modulo operation being 2, resulting in an access time of 11 pm+2 times 2 minutes). In this example, in case that the number of machine type communication devices 20 corresponds to one hundred, instead of receiving one hundred access requests at 11 pm according to the state of the art, the mobile communication network 100 (the base station 111) receives an average of ten access requests every 120 seconds starting at 11 pm.

In case that the access request of device #2 (at 11:04 pm) is unsuccessful, the retransmission time for the access request for device #2 corresponds, e.g., to 11:18 pm (as the digit sum 3+1+0+1+5+0+1+2+3+4+5+6+0+5 equals to 36 (i.e. taking the digit sum of the IMSI number of device #2 but without the last digit), the result of the modulo operation being 6, resulting in an access time of 11:04 pm (access time of the preceding access)+6 times 2 minutes+a gap time of, e.g., 2 minutes).

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for machine-type communication between a mobile communication network and a machine-type communication device, the method comprising:
    determining, by the machine-type communication device, a waiting time interval based on identity information and time interval information stored in the machine-type communication device, wherein determining the waiting time interval is further based on application of a hash function operation applied to the identity information; and
    requesting, by the machine-type communication device, access to a random access resource of the mobile communication network after the determined waiting time interval has elapsed;
    wherein the hash function corresponds to a modulo operation on the numerical value of a number derived from the identity information or to a modulo operation on the digit sum of a number derived from the identity information;
    wherein a predetermined divisor value is used in the modulo operation; and
    wherein the divisor value used in the modulo operation corresponds to a number of groups to which machine type communication devices are assigned.

2. The method according to claim 1, wherein the determined waiting time interval corresponds to the product of the length of the time interval corresponding to the time interval information and the result of the hash function operation applied to the identity information.

3. The method according to claim 1, wherein the identity information comprises an International Mobile Subscriber identity (IMSI) and/or an International Mobile Equipment Identity (IMET) and/or a Media Access Control (MAC) address.

4. The method according to claim 1, wherein the requesting is further based on a predetermined point in time, wherein the requesting occurs after the determined waiting time interval has elapsed relative to the predetermined point in time.

5. The method according to claim 1, wherein a spreading amongst different Random Access Channel (RACH) preambles is performed by applying a second hash function operating on a modified version of the identity information or on other identity information.

6. The method according to claim 5, wherein the second hash function corresponds to a second modulo operation.

7. A machine-type communication device capable of machine-type communication with a mobile communication network, the machine-type communication device being configured to:
    determine a waiting time interval based on identity information and time interval information stored in the machine-type communication device, wherein determining the waiting time interval is further based on application of a hash function operation applied to the identity information; and request, by the machine-type communication device, access to a random access resource of the mobile communication network after the determined waiting time interval has elapsed;

wherein the hash function corresponds to a modulo operation on the numerical value of a number derived from the identity information or to a modulo operation on the digit sum of a number derived from the identity information;

wherein a predetermined divisor value is used in the modulo operation; and wherein the divisor value used in the modulo operation corresponds to a number of groups to which machine type communication devices are assigned.

8. The machine-type communication device of claim 7, wherein the determined waiting time interval corresponds to the product of the length of the time interval corresponding to the time interval information and the result of the hash function operation applied to the identity information.

9. The machine-type communication device of claim 7, wherein the identity information comprises an International Mobile Subscriber Identity (IMSI) and/or an International Mobile Equipment Identity (IMEI) and/or a Media Access Control (MAC) address.

10. A non-transitory computer-readable medium having processor-executable instructions stored thereon for machine-type communication between a mobile communication network and a machine-type communication device, the processor-executable instructions comprising instructions for:

determining a waiting time interval based on identity information and time interval information stored in the machine-type communication device, wherein determining the waiting time interval is further based on application of a hash function operation applied to the identity information; and requesting access to a random access resource of the mobile communication network after the determined waiting time interval has elapsed;

wherein the hash function corresponds to a modulo operation on the numerical value of a number derived from the identity information or to a modulo operation on the digit sum of a number derived from the identity information;

wherein a predetermined divisor value is used in the modulo operation; and wherein the divisor value used in the modulo operation corresponds to a number of groups to which machine type communication devices are assigned.

11. The non-transitory computer-readable medium according to claim 10, wherein the determined waiting time interval corresponds to the product of the length of the time interval corresponding to the time interval information and the result of the hash function operation applied to the identity information.

12. The non-transitory computer-readable medium according to claim 10, wherein the identity information comprises an International Mobile Subscriber Identity (IMSI) and/or an International Mobile Equipment Identity (IMEI) and/or a Media Access Control (MAC) address.

13. The non-transitory computer-readable medium according to claim 10, wherein the requesting is further based on a predetermined point in time, wherein the requesting occurs after the determined waiting time interval has elapsed relative to the predetermined point in time.

14. The non-transitory computer-readable medium according to claim 10, wherein a spreading amongst different Random Access Channel (RACH) preambles is performed by applying a second hash function operating on a modified version of the identity information or on other identity information.

15. The non-transitory computer-readable medium according to claim 10, wherein the second hash function corresponds to a second modulo operation.

16. A mobile communication network for enhancing machine type communication with a machine type communication device, the machine-type communication device being configured to:

determine a waiting time interval based on identity information and time interval information stored in the machine-type communication device, wherein determining the waiting time interval is further based on application of a hash function operation applied to the identity information; and request, by the machine-type communication device, access to a random access resource of the mobile communication network after the determined waiting time interval has elapsed;

wherein the hash function corresponds to a modulo operation on the numerical value of a number derived from the identity information or to a modulo operation on the digit sum of a number derived from the identity information;

wherein a predetermined divisor value is used in the modulo operation; and wherein the divisor value used in the modulo operation corresponds to a number of groups to which machine type communication devices are assigned;

the mobile communication device comprising a transmitting device configured to transmit the time interval information and an information related to the hash function operation.

17. The mobile communication network according to claim 16, wherein the information related to the hash function operation includes a predetermined devisor value used in the module operation.

* * * * *